W. C. McDOWELL & E. C. EWELL.
Fruit-Drier.
No. 205,662. Patented July 2, 1878.
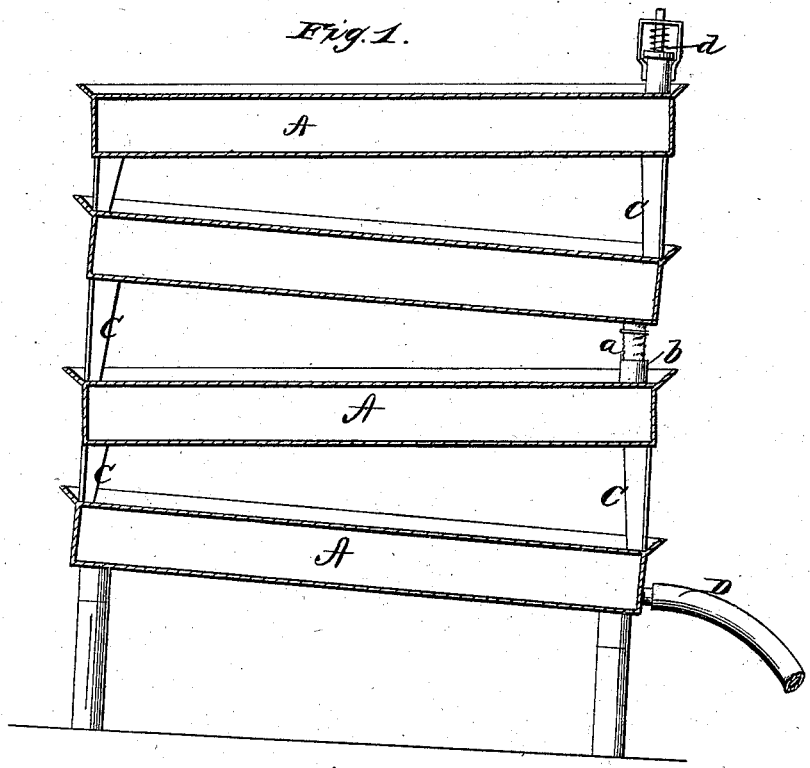
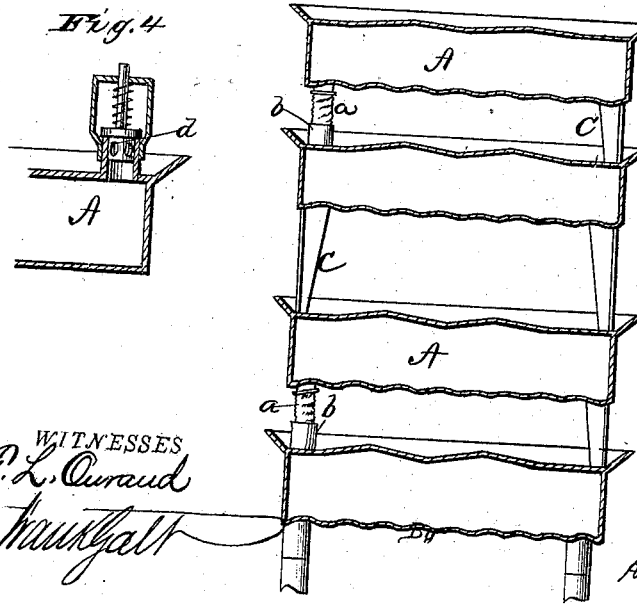

UNITED STATES PATENT OFFICE.

WILLIAM C. McDOWELL AND EDMUND C. EWELL, OF ROMEO, MICHIGAN.

IMPROVEMENT IN FRUIT-DRIERS.

Specification forming part of Letters Patent No. 205,662, dated July 2, 1878; application filed May 29, 1878.

*To all whom it may concern:*

Be it known that we, WILLIAM C. MCDOWELL and EDMUND C. EWELL, of Romeo, in the county of Macomb, and in the State of Michigan, have invented certain new and useful Improvements in Fruit-Driers; and do hereby declare that the following is a full, clear, and exact description thereof, reference being had to the accompanying drawings, and to the letters of reference marked thereon, making a part of this specification.

The nature of our invention consists in the construction and arrangement of a fruit-drier, as will be hereinafter more fully set forth.

In order to enable others skilled in the art to which our invention appertains to make and use the same, we will now proceed to describe its construction and operation, referring to the annexed drawing, in which—

Figure 1 is a longitudinal vertical section of our invention. Fig. 2 is a transverse vertical section of the same. Fig. 3 is an enlarged section in detail of a part. Fig. 4 is a detailed view of the escape-valve.

Our fruit-drier is composed of a series of hollow pans, A A, placed one above the other, and of any desired size. These pans are connected at opposite corners by flexible pipes $a$, which unite with short pipes $b$ $b$ projecting from the tops and bottoms of the pans, as shown fully in Fig. 3, so as to allow free passage of steam upward through the entire system of pans, and at the same time the flexible pipes $a$ form a packing for the pipes $b$ $b$, and also allow of the pans being easily detached from each other and connected together again as required. The top pan in the series is provided with a valve, $d$, to allow the escape of any over-pressure of steam. The pans are, in the other three corners, supported upon legs C C, which hold them at a suitable distance from each other. The pans are slightly inclined alternately in opposite directions, to allow the condensed steam to return direct to the generator. The fruit is placed on top of each pan, and the steam is admitted through a pipe, D, from a suitable steam-generator into the bottom pan, and through this to the next one, and so on through all the pans in the series.

By our construction of the fruit-drier it has an almost unlimited capacity, without occupying any more room than a single pan. Each layer of fruit has a double radiating-surface, or one above and one below it.

The drip returns direct to the generator, whereby the latent heat contained therein is utilized. The evaporation of one pan does not come in contact with the contents of the other. The pans can be easily removed one from another for cleaning, emptying, and filling.

The pans are corrugated longitudinally, as shown, to equalize the expansion.

We are aware that fruit-driers are not new in which a series of hollow pans are arranged one above the other with connections for the steam to pass from one to the other, and hence we do not claim such, broadly, as our invention.

Having thus fully described our invention, what we claim as new, and desire to secure by Letters Patent, is—

In a fruit-drier, a series of hollow pans, placed one above the other, and inclining alternately in opposite directions, connected together by flexible pipes at opposite corners, the bottom pan provided with a steam-inlet and the top pan with an escape-valve, all substantially as and for the purposes herein set forth.

In testimony that we claim the foregoing we have hereunto set our hands this 13th day of May, 1878.

WILLIAM C. McDOWELL.
   EDMUND C. EWELL.

Witnesses:
 J. L. STARKWEATHER,
 JACOB H. HOMER.